(12) United States Patent
Gandhi et al.

(10) Patent No.: US 9,412,088 B2
(45) Date of Patent: Aug. 9, 2016

(54) SYSTEM AND METHOD FOR INTERACTIVE COMMUNICATION CONTEXT GENERATION

(75) Inventors: Sapan Gandhi, Pune (IN); Anand Paithankar, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 1094 days.

(21) Appl. No.: 12/986,325

(22) Filed: Jan. 7, 2011

(65) Prior Publication Data

US 2012/0179982 A1    Jul. 12, 2012

(51) Int. Cl.
*G06F 3/00* (2006.01)
*G06Q 10/10* (2012.01)
*H04L 12/18* (2006.01)
*G06F 3/01* (2006.01)
*H04L 12/58* (2006.01)

(52) U.S. Cl.
CPC ............ *G06Q 10/10* (2013.01); *H04L 12/1822* (2013.01); *H04L 12/1831* (2013.01); *H04L 51/066* (2013.01)

(58) Field of Classification Search
CPC ............ H04L 12/1822; H04L 12/1831; H04L 51/066

USPC .......................... 715/753, 756, 810, 816, 825
See application file for complete search history.

(56) References Cited

U.S. PATENT DOCUMENTS

| | | | |
|---|---|---|---|
| 6,415,020 B1 * | 7/2002 | Pinard et al. | 379/88.11 |
| 7,289,620 B2 * | 10/2007 | Shaffer et al. | 379/215.01 |
| 7,391,432 B2 * | 6/2008 | Terada | 348/14.08 |
| 7,606,909 B1 * | 10/2009 | Ely et al. | 709/227 |
| 8,233,606 B2 * | 7/2012 | Brunson | 379/204.01 |
| 2006/0122840 A1 * | 6/2006 | Anderson et al. | 704/275 |
| 2008/0232556 A1 * | 9/2008 | Gilbert et al. | 379/88.01 |
| 2009/0161845 A1 | 6/2009 | Adams et al. | |
| 2009/0252314 A1 * | 10/2009 | Cassanego et al. | 379/201.01 |
| 2010/0093315 A1 | 4/2010 | Grosch et al. | |
| 2010/0316207 A1 * | 12/2010 | Brunson | 379/202.01 |

* cited by examiner

*Primary Examiner* — Nicholas Augustine
(74) *Attorney, Agent, or Firm* — Sheridan Ross P.C.

(57) ABSTRACT

An interactive communication, such as a video conference or an audio communication, is established and a user places the interactive communication on hold. Prior to and/or after the interactive communication was placed on hold, context information related to when the interactive communication was placed on hold is gathered. The interactive communication is taken off hold and the context information is presented to the user; thus providing the user with the context of the interactive communication when it was placed on hold.

22 Claims, 6 Drawing Sheets

SYSTEM AND METHOD FOR INTERACTIVE COMMUNICATION CONTEXT GENERATION

TECHNICAL FIELD

The system and method relates to communication systems and in particular to context generation based on a communication being placed on hold.

BACKGROUND

In today's business environment, a user may be bombarded by a variety of different interactive communications, such as voice, video, email, Instant Messaging (IM), and the like. At times, the user can be involved in a first communication, only to be interrupted by a second communication. If the user has to take the second communication and place the first communication on hold, sometimes, if the second communication takes very long, the user may forget what was being discussed in the first communication. This can lead to frustration as the parties of the first communication have to regain the context of the first communication prior to being placed on hold.

Some systems have attempted to address these issues, such as to identify the context of an upcoming appointment or call by looking at known interactions that the parties of the communication may have with each other prior to the initiation of the communication. For example, information from prior emails, past appointments, future appointments, phone numbers, names, and the like may be presented to the user to help the user remember a context associated with an upcoming communication. However, during the communication, the context of the communication may be constantly evolving; thus, at times, rendering the prior context irrelevant. What is needed is a way to capture information related to the context of a communication placed on hold and present it to a user.

SUMMARY

The system and method are directed to solving these and other problems and disadvantages of the prior art. An interactive communication, such as a video conference or an audio communication, is established and a user places the interactive communication on hold. Prior to and/or after the interactive communication was placed on hold, context information related to when the interactive communication was placed on hold is gathered. The interactive communication is taken off hold and the context information is presented to the user; thus providing the user with the context of the interactive communication when the interactive communication was placed on hold.

Gathering context information related to when an interactive communication is placed on hold can be accomplished in various ways, such as a user providing the context information. Other options include getting context information by recording segments of the interactive communication and presenting the recorded segments to the user. Still other options include getting context information by looking for identified words, phrases, and/or emotional responses in the interactive communication. Still other alternatives include presenting video shots, such as a specific slide in a slide presentation, specific views of documents, and/or a picture of a video communication when the interactive communication was placed on hold. The user can be presented with various options to allow the user to select different types of context information to be displayed before returning to the interactive communication.

Other options include the ability to forward context information when the interactive communication is forwarded. This allows a user who receives the forwarded interactive communication to have context information about when the interactive communication was first placed on hold.

BRIEF DESCRIPTION OF THE DRAWINGS

These and other features and advantages of the system and method will become more apparent from considering the following description of an illustrative embodiment of the system and method together with the drawing, in which.

DETAILED DESCRIPTION

Some embodiments will be illustrated below in conjunction with an exemplary communication system. Although well suited for use with, e.g., a system using switch(es), server(s) and/or database(s), communication devices, etc., the embodiments are not limited to use with any particular type of communication system or configuration of system elements. Those skilled in the art will recognize that the disclosed techniques may be used in any communication system in which it is desirable to provide enhanced management of interactive communications.

Figure 1:
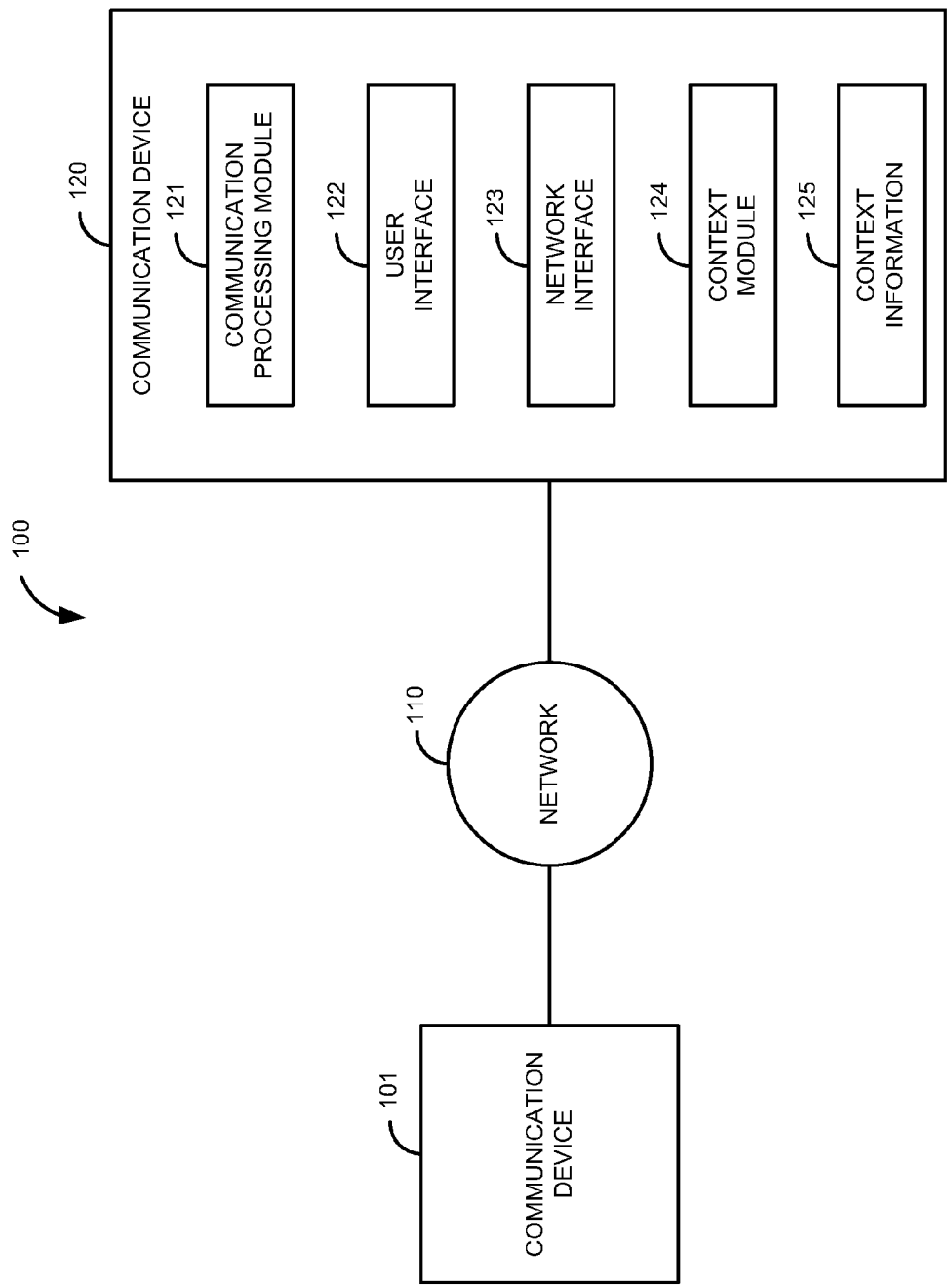
FIG. 1 is a block diagram of a first illustrative system for getting context information about an interactive communication.

FIG. 1 is a block diagram of a first illustrative system 100 for getting context information about an interactive communication. FIG. 1 comprises communication device 101, network 110, and communication device 120. Communication device 101 can be any type of communication device that can support an interactive communication, such as a telephone, a cellular telephone, a Personal Computer (PC), a Personal Digital Assistant (PDA), a laptop computer, a notebook computer, a server, and the like. Communication device 101 can comprise multiple communication devices, such as a PC and a telephone. An interactive communication may be any communication that requires two- (or more) way interaction, such as a telephone call, a conference call, a video call, an audio conference, a video conference, an Instant Message (IM) communication, an email communication, and the like. An interactive communication can use a variety of different protocols, such a Session Initiation Protocol (SIP), Integrated Services Digital Network (ISDN), Internet Protocol (IP), H.323, and the like. Communication device 101 may comprise all or some of the elements (121-125) of communication device 120. For example, communication device 101 may only comprise network interface 123 and a different communication processing module. Communication device 101 may be identical to communication device 120.

Network 110 may be any kind of network supporting any kind of communication protocol, such as the Internet, the Public Switched Telephone Network (PSTN), a Local Area Network (LAN), a Wide Area Network (WAN), Integrated Services Digital Network (ISDN), and the like. Communication device 101 is shown as connected to communication device 120 via network 110. However, communication device 101 can directly connect to communication device 120.

Communication device 120 can be any type of communication device that can support an interactive communication, such as a telephone, a cellular telephone, a Personal Computer (PC), a Personal Digital Assistant (PDA), a laptop computer, a notebook computer, and the like. Communication device 120 can comprise multiple communication devices, such as a PC and a telephone.

Communication device 120 further comprises communication processing module 121, user interface 122, network interface 123, context module 124, and context information 125. Communication processing module 121 can be any hardware/software that can process an interactive communication. For example, communication processing module 121 can be a microprocessor, a Digital Signal Processor (DSP), and/or other hardware/software. Communication processing module 121 can process different types of communication protocols, such as Session Initiation Protocol (SIP). User interface 122 can comprises a variety of different input/output devices, such as a video display, a Graphical User Interface (GUI), a mouse, a speaker, a touch screen, a button, a trackball, a touch pad, a microphone, and the like.

Network interface 123 can be any type of network interface, such as a network interface card, an Ethernet card, a wireless interface, an optical interface, a modem, an ISDN interface, and the like. Context module 124 can be any hardware/software that can get context information 125 related to an interactive communication; for example, context module 124 can record different parts of the interactive communication, gather information about the interactive communication from a user, perform word/phrase spotting in the interactive communication, and the like.

Communication processing module 121 establishes an interactive communication with communication device 101. This can be accomplished in a variety of ways, such as directly (e.g., in a peer to peer network), via communication equipment in network 110 (not shown), and/or various combinations of these, and/or other communication methods known in the art. As the interactive communication is established between communication device 101 and communication device 120, network interface 123 sends and receives the interactive communication. For example, if the interactive communication is a SIP communication, network interface 123 will send and receive SIP packets associated with the interactive communication.

Communication processing module 121 places the interactive communication on hold. The interactive communication can be placed on hold in a variety of ways. For example, the user places a voice call on hold by pressing a hold button on user interface 123. Other examples can be where the user places the interactive communication on hold by moving the called party out of a call context on a Graphical User Interface, where the interactive communication is automatically placed on hold by detection of an incoming video/voice call or IM session from a specific user, based on verbal commands, and the like. Still other options to placing an interactive communication on hold include placing a video communication on hold by minimizing a window containing the interactive video communication.

Context module 124 gets context information 125 related to when the interactive communication was placed on hold. Context information 125 can comprise various types of information related to when the interactive communication was placed on hold. For example, context information 125 can comprise a recorded segment of the interactive communication, specific identified words in the interactive communication, specific phrases in the interactive communication, an emotional evaluation of the interactive communication, and/or the like.

Communication processing module 121 takes the interactive communication off hold. This can be accomplished in a variety of ways, such as the user touching a button on a touch screen (via user interface 122), automatically when a second communication that caused the interactive communication to go on hold ends, based on a verbal command (via user interface 122), and the like. The gathered context information 125 is presented to the user in user interface 122. When and how context information 125 is presented can be accomplished in various ways. For example, context information 125 can be presented to the user visually, audibly, through vibrations, through various combinations of these, and the like. For instance, a speech-to-text conversion of the last 20 seconds of an interactive voice communication before it was placed on hold can be displayed to the user via user interface 122. Similarly, the last 30 seconds of a video conference can be played to the user. Other alternatives can include marking out important points in a Multimedia Call based on user input or Natural Language processing (word spotting). The entire stream is automatically created and played out to the user where the user can move about the stream based on the marked points. Context information 125 can be presented to the user before, during, and/or after the interactive communication is taken off hold. As context information 125 is presented to the user, the user can remember the context of the interactive communication that was placed on hold.

Figure 2:
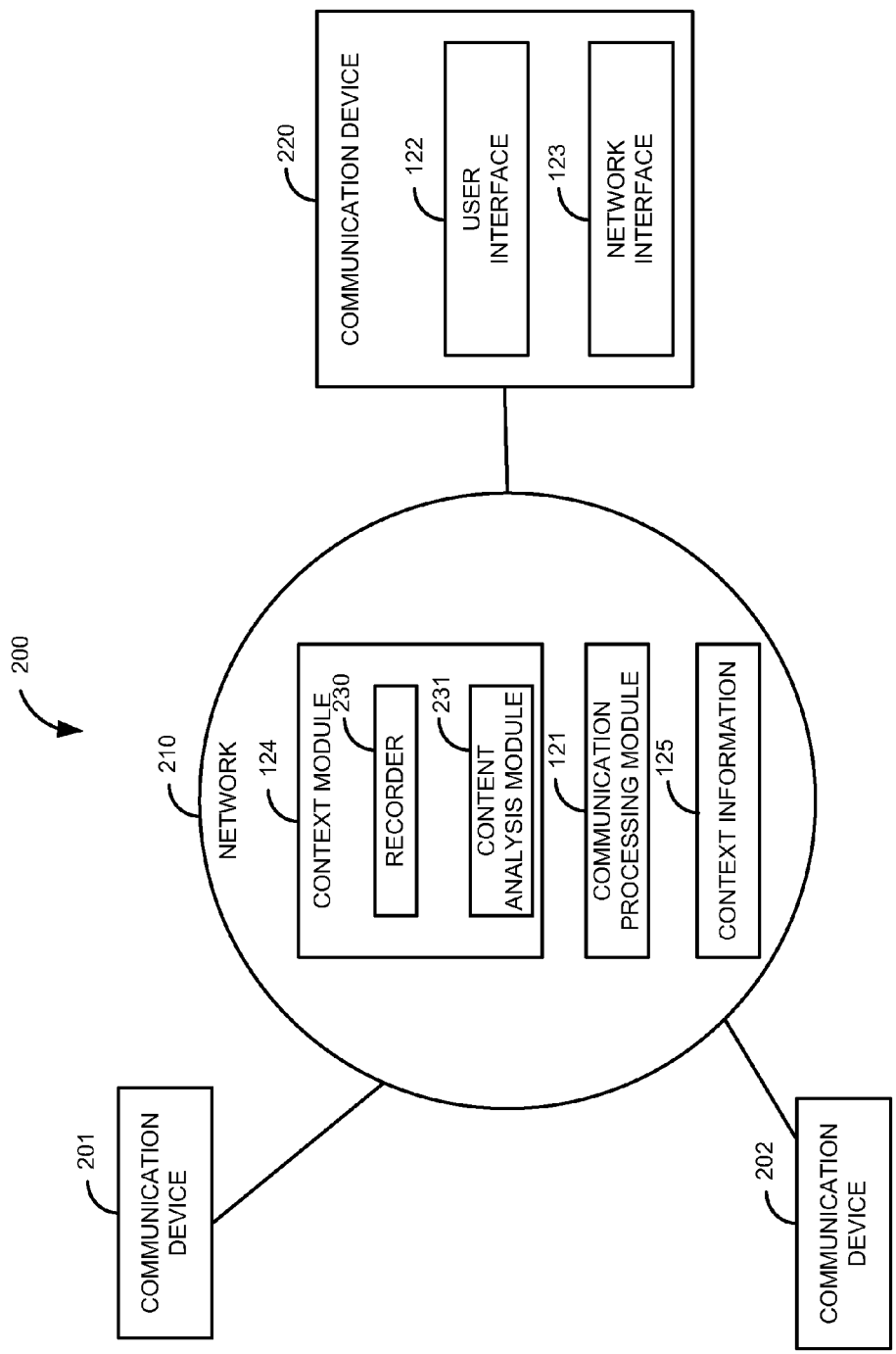
FIG. 2 is a block diagram of a second illustrative system for getting context information about an interactive communication.

FIG. 2 is a block diagram of a second illustrative system 200 for getting context information about an interactive communication. The second illustrative system 200 comprises communication devices 201, 202, 220, and network 210. Communication devices 201 and 202 can be any type of communication devices. Communication device 220 comprises user interface 122 and network interface 123. Network 210 can be any type of network previously described.

Network 210 comprises context module 124, communication processing module 121, and context information 125. These elements (124, 121, and 125) can reside on various devices in network 210, such as telecommunications equipment, Private Branch Exchanges (PBX), bridges, mixers, servers, switches, routers, and the like. In FIG. 2, elements 121, 124, and 125 are shown in network 210 and elements 122-123 are shown in communication device 220. However, context module 124, communication processing module 121, and context information 125 can reside in network 210 and/or in communication device 220. Communication processing module 121 can be any communication hardware/software that can process interactive communications. Context information 125 can be any type of context information.

Context module 124 further comprises recorder 230 and content analysis module 231. Recorder 230 and content analysis module 231 are shown as elements of context module 124. However, recorder 230 and content analysis module 231 may be implemented as separate elements (i.e., distributed on different devices, such as communication device 220) in a distributed context module 124. Recorder 230 can be any recorder that can record part or all of an interactive communication. For example, recorder 230 can record all and/or part of video communications, audio communications, Instant Message communications, email communications, and the like.

Content analysis module 231 can analyze any interactive communication for various kinds of content. For instance, content analysis module 231 can analyze the interactive communication for words and/or phrases in the interactive communication. Content analysis module 231 can perform an emotional evaluation of the interactive communication by looking for specific words/phrases, inflections, vocal strengths, facial expressions, gestures, and the like. Context information 125 can be displayed in a variety of ways, such as using different colors, fonts, italics, windows, menus, pop-ups, and the like. For example, if a call participant is angry, then context information 125 can be displayed in the color red or as a red icon. Content analysis module 231 can analyze an interactive video communication by storing the view of a specific slide of a presentation that was displayed at the time the video communication was placed on hold, by storing a specific view of a document that was displayed at the time the video communication was placed on hold, and by storing a picture of the video communication at the time the video communication was placed on hold (e.g., a thumbnail of the picture), and the like.

To give an illustrative example, consider the following. An interactive video communication is set up between communication devices 201, 202, and 220. Packets of the interactive video communication are sent to and from network interface 123 to communication devices 201 and 202 via network 210. During the interactive video communication, a user of communication device 220 receives a voice communication and places the interactive video communication on hold by minimizing a window containing the interactive video conference. Recorder 230 in context module 124 has recorded the last 30 seconds of the interactive video communication prior to the interactive video communication being placed on hold. The user takes about five minutes to complete the voice communication. Prior to taking the interactive video communication off hold, the user clicks on a button in user interface 122 to play the recording of the last 30 seconds of the interactive video communication. The user then takes the interactive video communication off hold and rejoins the interactive video communication.

To further illustrate this example, assume that content analysis module 231 in context module 124 has also monitored the sound of the interactive video conference to identify words/phrases that have been repeated in the sound of the interactive video conference since the user placed the interactive video conference on hold. When the user takes the interactive video communication off hold, the identified words/phrases are shown at the bottom of the window that contains the interactive video conference. Moreover, the words/phases can be over-laid in a word cloud. The user can then use this information to understand what had been talked about since he/she left the interactive video conference.

Figure 3:
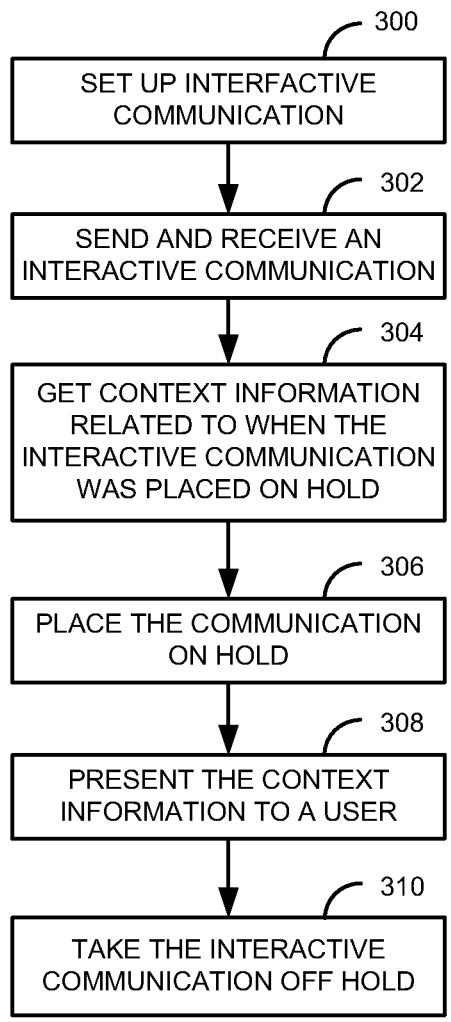
FIG. 3 is a flow diagram of a method for getting context information about an interactive communication.

FIG. 3 is a flow diagram of a method for getting context information about an interactive communication. Illustratively, communication processing module 121, user interface 122, network interface 123, context module 124, and context information 125 are stored-program-controlled entities, such as a computer or processor, which performs the method of FIGS. 3-6 and the processes described herein by executing program instructions stored in a tangible computer-readable storage medium, such as a memory or disk.

The process begins in step 300 when an interactive communication is set up (e.g., by a Private Branch Exchange (PBX) in network 100). As a result of the interactive communication being set up, information from the interactive communication is sent and received 302 at network interface 123. The information that is sent and received can be, for example, control packets, data packets, Time Division Multiplexed data, signaling information, and the like. Context module 124 gets 304 context information 125 related to when the interactive communication was placed on hold. Step 304 is shown as taking place before step 306. However, step 304 can also take place concurrently with step 306 and/or after step 306.

Communication processing module 121 places 306 the interactive communication on hold. For example, communication processing module 121 can place 306 the interactive communication on hold based on an incoming email or on the user touching a hold button on user interface 122. Context information 125 is presented 308 to a user via user interface 122. Communication processing module 121 takes 310 the interactive communication off hold. For example, communication processing module 121 can take the interactive communication off hold based on the user responding to the exemplary email described above in step 306. Step 308 is shown in FIG. 3 to take place before step 310. However, step 308 can also take place concurrently and/or after step 310.

Figure 4:
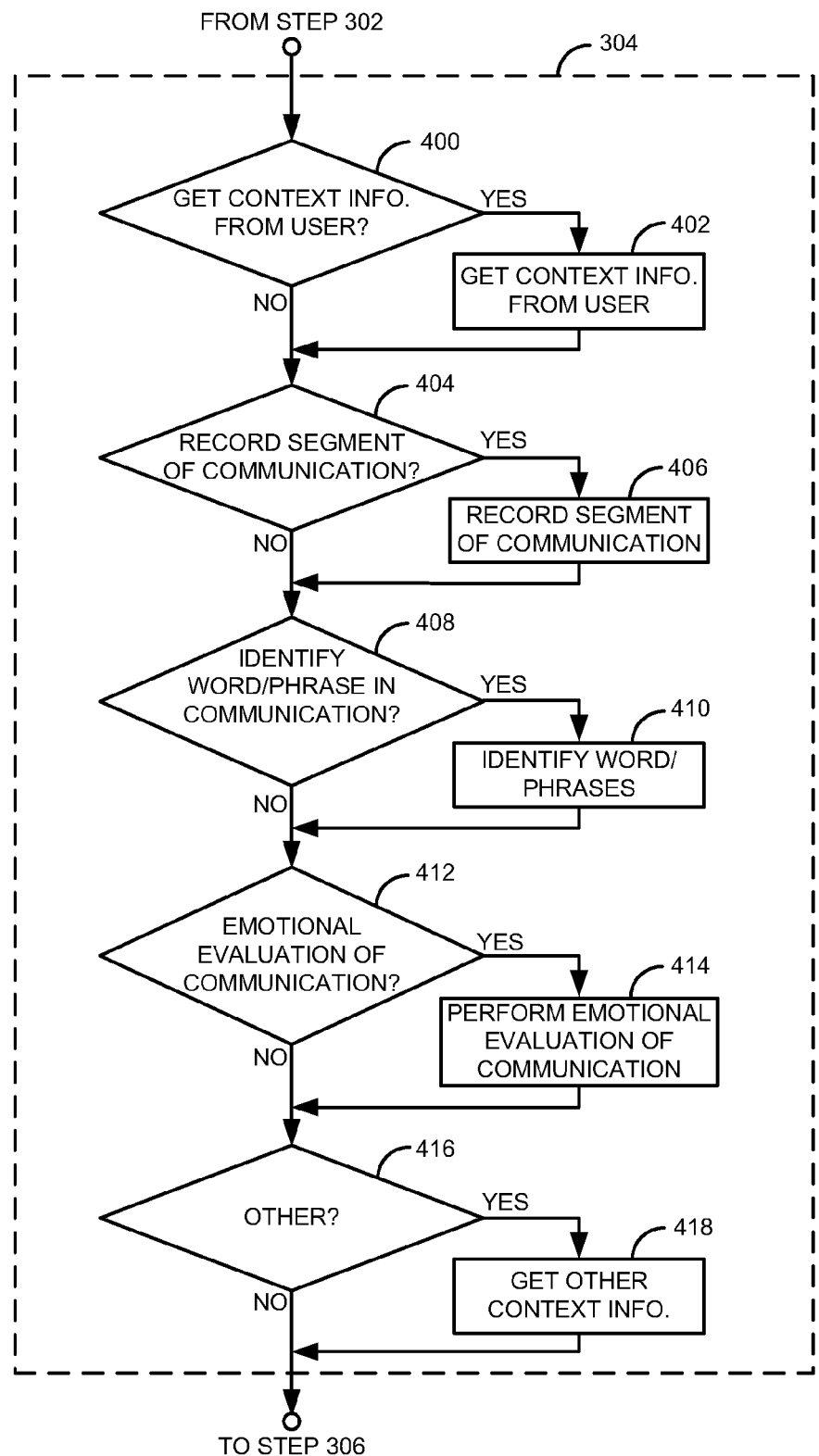
FIG. 4 is a flow diagram of a method for getting different kinds of context information about an interactive communication.

FIG. 4 is a flow diagram of a method for getting different kinds of context information 125 about an interactive communication. FIG. 4 is an exemplary embodiment of step 304 in FIG. 3. After the interactive communication is set up and information is being sent and received in steps 300 and 302, context module 124 determines in step 400 whether to get context information 125 from a user. If there is context information 125 to get from the user in step 400, context module 124 gets 402 context information 125 from the user and the process goes to step 404. Getting context information 125 from a user can be accomplished in a variety of ways. For instance, context module 124 can get context information 125 from the user who is typing in context information 125 in a window that is displayed to the user via user interface 122. Context module 124 can get context information 125 from the user via a microphone in user interface 122 and the like.

If there is not any context information 125 to get from the user in step 400, context module 124 determines in step 404 if it is required to record a segment of the interactive communication. If it is required to record a segment of the interactive communication in step 404, recorder 230 records 406 the segment of the interactive communication. The recorded segment of the interactive communication can comprise any part and/or parts of the interactive communication for any duration. For example, the recorded segment can be the first twenty seconds of the interactive communication, the last thirty seconds of the interactive communication before the interactive communication was placed on hold, the last twenty seconds of the interactive communication, various combinations of these, and the like.

If it is not required to record a segment of the interactive communication in step 404, context module 124 determines in step 408 whether to identify words and/or phrases in the interactive communication. If it is determined in step 408 to identify words and/or phrases in the interactive communication, content analysis module 231 identifies 410 the words and/or phrases in the interactive communication and the process goes to step 412. Identifying key words or phrases can be done in various ways. For instance, frequencies of individual words and/or frequencies of phrases in the interactive communication can be identified in an audio/video communication, an Instant Message, an email, and the like. The word frequencies can then be filtered through known algorithms that compare the word frequencies with word frequencies in generic speech/communication to produce context information 125. The words/phrases can be identified from predefined words and/or phrases or using other methods/algorithms known in the art. The identified phrases can be stored in context information 125.

If it is determined not to identify words and/or phrases in the interactive communication in step 408, context module 124 determines in step 412 if an emotional evaluation of the interactive communication is to be performed. If an emotional evaluation of the interactive communication is to be performed in step 412, content analysis module 231 performs 414 an emotional evaluation of the interactive communication and the process goes to step 416. An emotional analysis can be performed in a variety of ways. For example, the interactive communication can be analyzed by looking for specific words/phrases that indicate emotion or lack of emotion, by looking at voice inflections, raised voices (e.g., in relation to prior voices in the interactive communication), facial expressions, gestures, and the like. The indicated emotion can be stored in context information 125.

If it is determined not to perform an emotional evaluation of the interactive communication in step 412, context module 124 determines in step 416 if there are other types of context information 125 to get. If there are other types of context information 125 to get in step 416, context module 124 gets 418 the other context information 125. Other context information 125 can be, for example, a specific slide of a presentation that was displayed at the time a video communication was placed on hold, a specific view of a document that was displayed at the time a video communication was placed on hold, a picture of a video communication at the time the video communication was placed on hold, and the like. This information is stored in context information 125. If it is determined in step 416 that there are not other types of context information 125 to get, the process goes to step 306.

Figure 5:
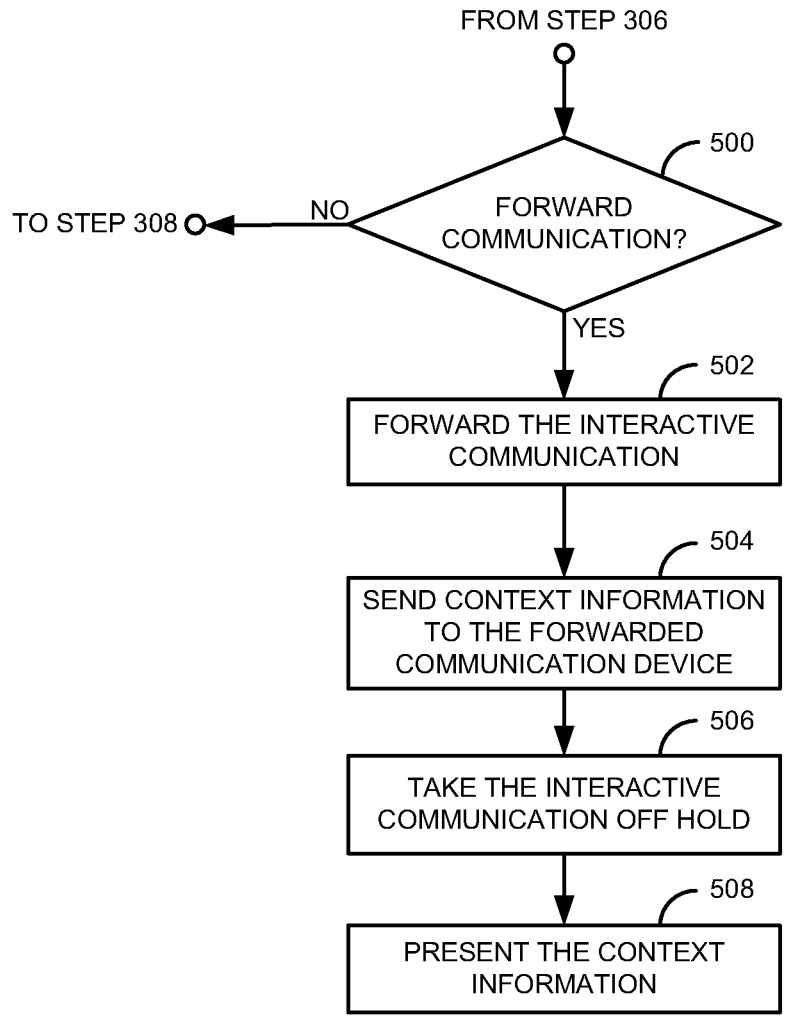
FIG. 5 is a flow diagram of a method for preserving context information when an interactive communication is forwarded.

FIG. 5 is a flow diagram of a method for preserving context information 125 when an interactive communication is forwarded. The method of FIG. 5 as shown is inserted between steps 306 and 308 in FIG. 3. After the interactive communication is placed on hold in step 306, communication processing module 121 determines in step 500 if the interactive communication is to be forwarded. If the interactive communication is not to be forwarded in step 500, the process goes to step 308.

Otherwise, if the interactive communication is to be forwarded in step 500, communication processing module 121 forwards 502 the interactive communication to a communication device (e.g., communication device 202). The interactive communication can be forwarded for different reasons and in different ways. For instance, the interactive communication can be forwarded by a user pushing/clicking on a call transfer button or a conference button. Context module 124 sends 504 context information 125 to the communication device (where the communication was forwarded). The communication device takes 506 the forwarded interactive communication off hold. This can be done, for example, by a user of the communication device. Context information 125 is presented 508 to the user.

In the above example, context information 125 is sent automatically. However, there can be a separate button that allows the user to decide whether to send context information 125 to the communication device. Context information 125 can be sent using proprietary formats, standard formats, and/or can be transcoded into various formats, such as voicemail, email, video messages, and the like.

Figure 6:
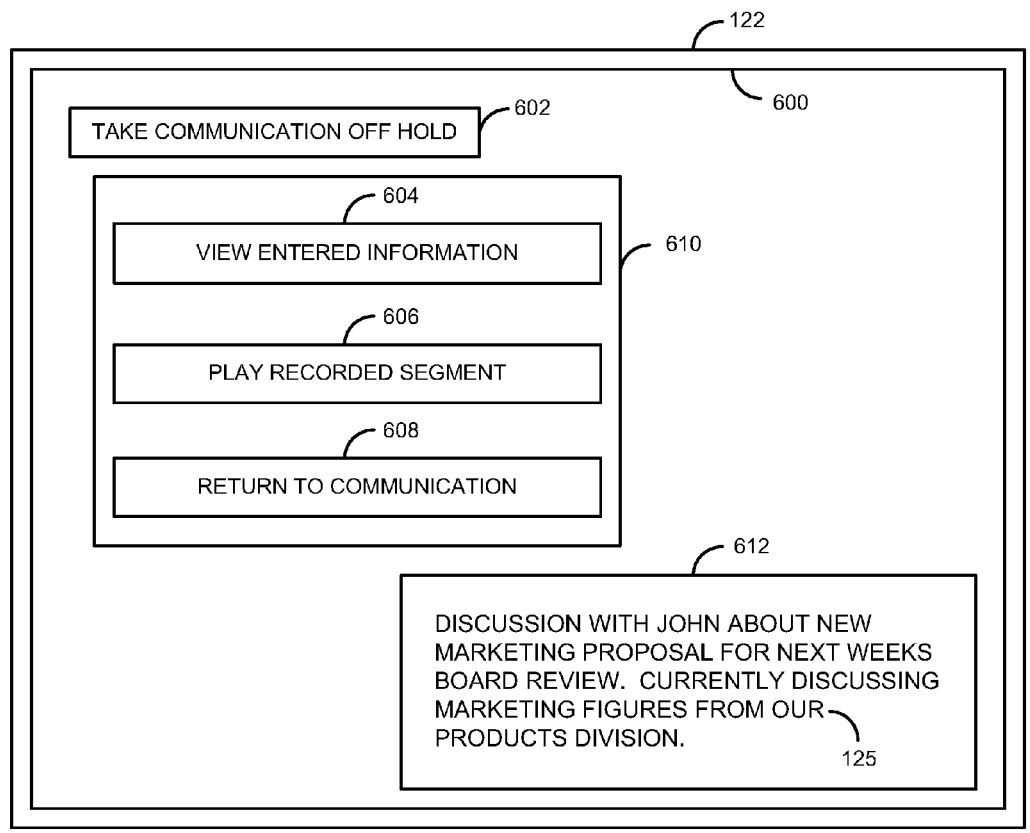
FIG. 6 is a diagram of a window for providing different context options to a user.

FIG. 6 is a diagram of a window for providing different context options to a user. FIG. 6 comprises user interface 122, video interface 600, take communication off hold button 602, context selection window 610, and context window 612. In this exemplary embodiment, user interface 122 further comprises video interface 602. Video interface 600 can be any video interface, such as a monitor, a Liquid Crystal Display (LCD), a Cathode Ray Tube (CRT), a touch screen, the screen of a touchpad, and the like.

Take communication off hold button 602 can be any button or methodology that allows the user to take the interactive communication off hold. Context selection window 610 can be any window or display that can allow a user visually to select different options. Context selection window 610 as shown further comprises view entered information button 604, play recorded segment button 606, and return to communication button 608. In this illustrative example, context selection window 610 is shown to comprise buttons 604, 606, and 608. However, other methodologies of user selection can easily be incorporated, such as checkboxes, radio buttons, and the like. Likewise, other buttons to display different context information can also be displayed in context selection window 610. Context window 612 can be any window or display that can show context information 125 to a user. Context information 125 as shown is presented as text in context window 612. However, context information 125 can be presented in various formats, such as text, images, icons, pictures, audio (e.g., speech/music), video streams, and the like.

In this illustrative example, as the interactive communication is in progress, context module 124 is recording the last thirty seconds of an audio conference (interactive communication). When the user places the audio conference on hold, the user enters context information 125 (e.g., via a window) that states "DISCUSSION WITH JOHN ABOUT NEW MARKETING PROPOSAL FOR NEXT WEEK'S BOARD REVIEW. CURRENTLY DISCUSSING MARKETING FIGURES FROM OUR PRODUCTS DIVISION." When the user is ready to return to the conference, context selection window 610 is shown to the user (i.e., when the user clicks on the take communication off hold button 600). Context selection window 610 is shown to the user. The user can select to view the entered information 125 by clicking on the view entered information button 604; this results in context window 612 being displayed. If the user wants to listen to the last thirty seconds of the audio conference before it was placed on hold, the user can select the play recorded segment button 606 to play the last thirty seconds of the audio conference (optionally with superimposed text of the conference). If the user wants to return to the audio conference, the user can click on the return to communication button 608.

The context information 125 that the user entered can also be combined with system-generated context information 125 (i.e., information automatically gathered based on a profile) to allow the user to understand the context more fully. For example, if the user has entered information as a sticky note, this can be presented along with audio context information 125 (e.g., the user playing the last 30 seconds of the audio conference). This allows the user to gain a greater context of the conference call when he/she left the conference.

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Herein, the term "a," "an," or another entity refers to one or more of that entity. As such, the terms "a" (or "an"), "one or more" and "at least one" can be used interchangeably herein.

It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated Figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
    sending and receiving, by a processor, at a network interface, an interactive communication, wherein the interactive communication is between a first user and one or more other users and wherein the first user is at a first communication device and the one or more other users are at one or more other communication devices;
    receiving, by the processor, an incoming email during the interactive communication;
    automatically placing, by the processor, at a communication processing module, the interactive communication on hold in response to receiving the incoming email;
    in response to placing the interactive communication on hold:
        sending, by the processor, a notification to the one or more other users that the interactive communication has been placed on hold; and
        getting, by the processor, in a context module, context information that comprises information taken from the interactive communication prior to the interactive communication being placed on hold;
    sending, by the processor, a response to the email while the interactive communication is on hold;
    in response to sending the email, taking, by the processor, the interactive communication off hold; and
    presenting, by the processor, in a user interface, the context information taken from the interactive communication prior to the interactive communication being placed on hold.

2. The method of claim 1, wherein getting the context information further comprises getting the context information from the first user, and wherein the context information from the first user is text information entered by the first user describing the interactive communication.

3. The method of claim 1, wherein the interactive communication is an audio or video communication and the context information is a recorded segment of the interactive communication that was recorded prior to the interactive communication being placed on hold.

4. The method of claim 1, wherein the interactive communication is an audio or video communication and the context information is an identified word and/or phrase that was spoken during the interactive communication prior to the interactive communication being placed on hold.

5. The method of claim 1, wherein the context information is an emotional evaluation of the interactive communication prior to the interactive communication being placed on hold.

6. The method of claim 1, wherein the interactive communication is a video communication and the context information, that is presented to the first user based on the interactive communication being placed on hold, comprises one of the following: a specific slide of a presentation that was displayed at the time the video communication was placed on hold, a specific view of a document that was displayed at the time the video communication was placed on hold, or a picture of the video communication at the time the video communication was placed on hold.

7. The method of claim 1, wherein the interactive communication is a video communication or an audio communication and the context information further comprises a recording of at least a portion of the interactive communication after the interactive communication was placed on hold.

8. The method of claim 1, wherein the context information comprises text information that the first user entered and a recorded segment of the interactive communication that was recorded prior to the interactive communication being placed on hold, and further comprising presenting to the first user a context selection window that gives the first user the option to view the information that the first user entered, to play the recorded segment of the interactive communication, and/or to return to the interactive communication.

9. The method of claim 1, wherein the context information is also received from the first user and further comprising:
    forwarding by the communication processing module, the interactive communication to a second communication device; and
    sending by the context module the context information to the second communication device in response to the forwarding.

10. A system comprising:
    a network interface, including a processor, that sends and receives an interactive communication, wherein the interactive communication is between a first user and one or more other users and wherein the first user is at a first communication device and the one or more other users are at one or more other communication devices;
    a communication processing module, including the processor, that receives an incoming email during the interactive communication and automatically places the interactive communication on hold in response to receiving the incoming email, sends a notification to the one or more other users that the interactive communication has been placed on hold, sends a response to the email while the interactive communication is on hold, and takes the interactive communication of hold in response to sending the email;
    a context module, including the processor, that gets context information that comprises information taken from the interactive communication prior to the interactive communication being placed on hold; and
    a user interface that presents the context information taken from the interactive communication prior to the interactive communication being placed on hold.

11. The system of claim 10, wherein the context module gets the context information from the first user, and wherein the context information from the first user is text information entered by the first user describing the interactive communication.

12. The system of claim 10, wherein the interactive communication is an audio or video communication and the context module gets the context information by recording a segment of the interactive communication that was recorded prior to the interactive communication being placed on hold.

13. The system of claim 10, wherein the interactive communication is an audio or video communication and the context module gets the context information by identifying a word and/or phrase that was spoken during the interactive communication prior to the interactive communication being placed on hold.

14. The system of claim 10, wherein the context module gets the context information by performing an emotional evaluation of the interactive communication prior to the interactive communication being placed on hold.

15. The system of claim 10, wherein the interactive communication is a video communication and the context information that is presented to the first user based on the interactive communication being placed on hold comprises one of the following: a specific slide of a presentation that was displayed at the time the video communication was placed on hold, a specific view of a document that was displayed at the time the video communication was placed on hold, or a picture of the video communication at the time the video communication was placed on hold.

16. The system of claim 10, wherein the interactive communication is a video communication or an audio communication and the context module gets the context information by recording at least a portion of the interactive communication after the interactive communication was placed on hold.

17. The system of claim 10, wherein:
the context module gets the context information from the first user, and gets the context information by recording a segment of the interactive communication, and wherein the segment of the interactive communication was recorded prior to the interactive communication being placed on hold; and
the user interface presents to the first user a context selection window that gives the first user the option to view the context information that the first user entered, plays the recorded segment of the interactive communication, and/or returns to the interactive communication.

18. The system of claim 10, wherein the context information is received from the first user and the communication processing module forwards the interactive communication to a second communication device, and wherein the context module sends the context information to the second communication device in response to the forwarding.

19. The system of claim 18, wherein the context module gets the context information by making an emotional evaluation of the interactive communication and/or by identifying words or phrases that were spoken during the interactive communication prior to the interactive communication being placed on hold.

20. The system of claim 10, wherein the context information is an emotional evaluation of the interactive communication and the context information is displayed using one of different colors, fonts, italics, windows, menus, icons, or pop-ups based on the emotional evaluation.

21. The method of claim 1, wherein the interactive communication is automatically placed on hold by detection of an incoming voice, video, or Instant Messaging call from a specific user.

22. The system of claim 10, wherein the interactive communication is automatically placed on hold by detection of an incoming voice, video, or Instant Messaging call from a specific user.

* * * * *